United States Patent [19]

Ampaya et al.

[11] 4,421,631

[45] Dec. 20, 1983

[54] HYDROCARBON TREATMENT PROCESS

[75] Inventors: Jaime P. Ampaya, Thousand Oaks; Laszlo A. Heredy, Canoga Park; Arthur L. Kohl, Woodland Hills, all of Calif.

[73] Assignee: Rockwell International Corporation, El Segundo, Calif.

[21] Appl. No.: 308,079

[22] Filed: Oct. 2, 1981

[51] Int. Cl.³ .............................................. C10G 9/34
[52] U.S. Cl. .................................. 208/8 R; 208/125; 585/648; 585/912
[58] Field of Search ............... 208/106, 130, 125, 8 R; 585/912, 648

[56] References Cited

U.S. PATENT DOCUMENTS

| | | | |
|---|---|---|---|
| 3,081,256 | 3/1963 | Hendal et al. | 208/125 |
| 3,252,773 | 5/1966 | Solomon et al. | 48/202 |
| 3,252,774 | 5/1966 | McMahon et al. | 48/214 |
| 3,553,279 | 1/1971 | Bawa | 208/125 X |
| 3,647,358 | 3/1972 | Greenberg | 23/2 R |
| 3,708,270 | 1/1973 | Birk et al. | 208/8 R X |
| 3,745,109 | 7/1973 | Heredy et al. | 208/107 |
| 3,835,033 | 9/1974 | Dugan et al. | 208/125 |
| 3,862,025 | 1/1975 | Steele et al. | 208/109 |
| 3,871,992 | 3/1975 | King et al. | 208/125 |
| 3,876,527 | 4/1975 | Dugan et al. | 585/912 X |
| 3,966,582 | 6/1976 | Cramer | 208/8 R |
| 4,092,236 | 5/1978 | Heredy | 208/8 R X |

OTHER PUBLICATIONS

Yamaguchi; F. et al., "COSMOS Cracks Crude to Olefine," *Hydrocarbon Processing*, Sep. 1979.

*Primary Examiner*—Delbert E. Gantz
*Assistant Examiner*—Glenn A. Caldarola
*Attorney, Agent, or Firm*—Henry Kolin; Clark E. DeLarvin; H. Fredrick Hamann

[57] ABSTRACT

The present invention provides a process for upgrading a hydrocarbon material in the presence of a molten salt in a manner which reduces the requirements for expensive ceramic materials to withstand the corrosive nature of the salt. A molten salt containing carbon is introduced into a heat generation zone which is located in a lower portion of an upwardly extending elongated reactor. Oxygen is introduced into the heat generation zone in an amount sufficient to react with substantially all of the carbon and to heat the molten salt to a desired temperature. The heated molten salt together with the gaseous reaction products of the carbon-oxygen reaction flows upwardly through the reactor to a hydrocarbon material reaction zone which is located within the reactor and above the heat generation zone. The hydrocarbon material to be treated is introduced into the reaction zone and into the molten salt where it produces gaseous reaction products and unreacted carbon entrained in the flowing molten salt. Thereafter the molten salt is introduced into a quench zone which is located above the reaction zone and into which there is introduced a quenching medium to reduce the temperature of the molten salt to a temperature below that at which expensive materials of construction, such as ceramics, are required.

12 Claims, 1 Drawing Figure

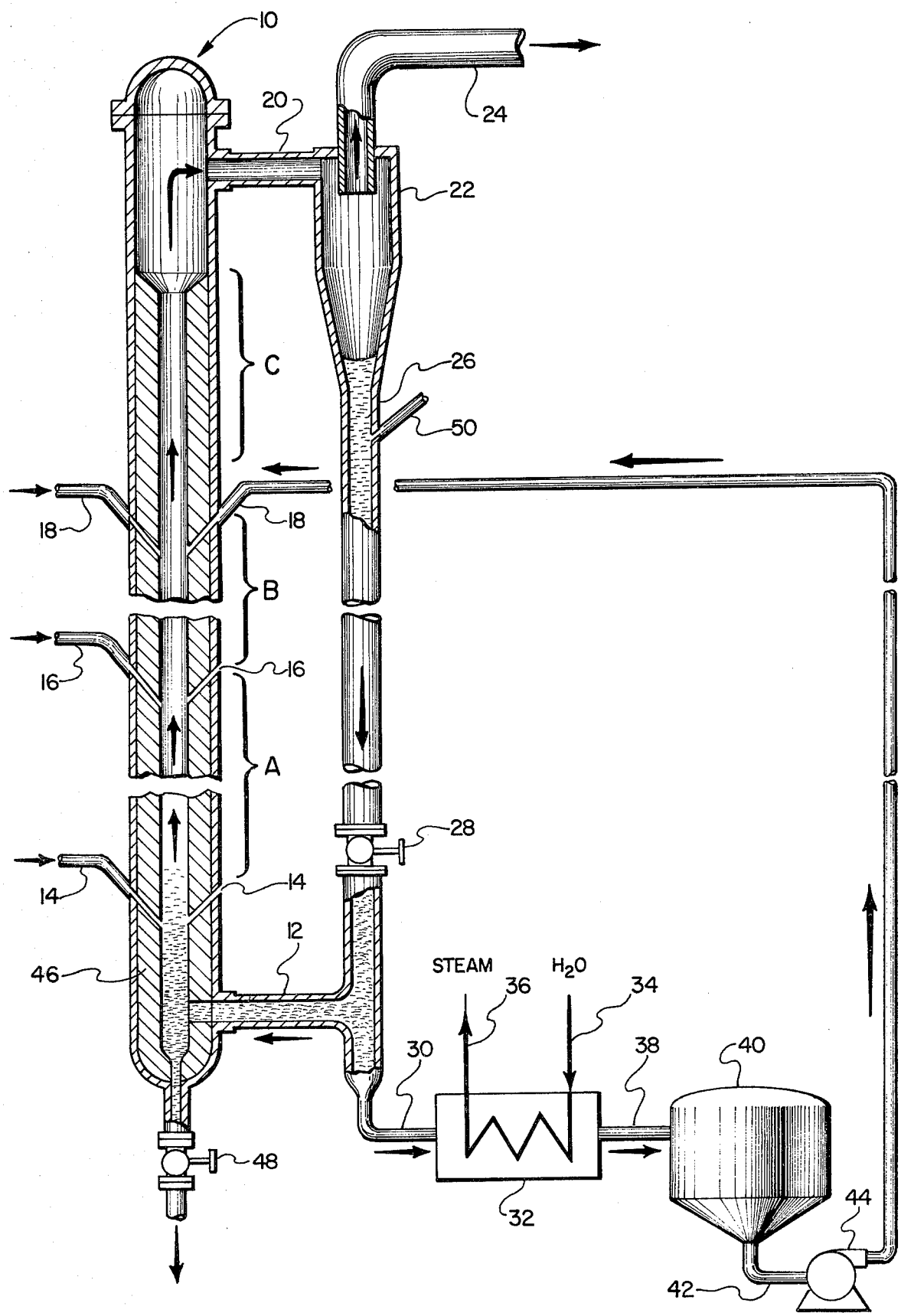

HYDROCARBON TREATMENT PROCESS

BACKGROUND OF THE INVENTION

1. Field of the Invention

Broadly, the present invention relates to the treatment of a hydrocarbon material to produce more valuable products. More particularly, the invention relates to the treatment of a hydrocarbon material in the presence of a molten salt to convert a substantial fraction of the feedstock into more valuable products by way of thermal cracking, catalytic cracking, or hydrocracking. Still further, the invention relates to a process for carrying out the hydrocarbon treatment wherein the hydrocarbon and products are carried in an entrained flow with molten salt.

2. Description of Prior Art

In the treatment of hydrocarbons such as coal, coal-derived products, and petroleum products or by-products such as residua, progress has depended to a large extent upon improvements in processes which are designed to convert partially refined hydrocarbon fractions into more valuable products. The conversion processes rely, almost without exception, upon the application of heat. Two basic types of processes are utilized: those using heat and hydrogen, and those using only heat.

Among those not using hydrogen, thermal cracking or pyrolysis is perhaps the oldest and most highly developed process. Thermal cracking involves splitting a large hydrocarbon molecule into smaller molecules at elevated temperatures. A portion of these smaller molecules represents olefins and stable light hydrocarbons, such as gasoline, refinery gas, light oils, and gas oils. The remaining products are generally referred to as heavy oils and coke. The process is generally referred to as thermal cracking when the feed is a gas oil or topped crude oil. If, on the other hand, the feed consists of a residual material, it is generally treated by thermal processes known as viscosity breaking or coking. Viscosity breaking is a mild reduction in molecule size and is usually conducted on a once-through basis, whereas the latter is a more severe cracking operation in which a significant portion of the feed is converted to solid petroleum coke. Conventional thermal cracking processes generally result in the formation of some coke and other low-grade products which can result in plugging of system components.

Hydrocracking is the decomposition of hydrocarbons at elevated temperatures and usually high pressures in the presence of hydrogen. Hydrocracking also may be accomplished in the presence of a catalyst. The objective of hydrocracking is to simultaneously hydrogenate the products while cracking the feedstock. The presence of hydrogen also has been found to suppress the formation of tar and coke to some extent.

A number of problems are involved in all of these processes, including catalyst deterioration caused by sulfur, ammonia, or ash which frequently are present in the feedsrock, coke buildup in the reactor components, and deactivation of the catalyst by coke deposition, or mineral matter which is frequently present in a petroleum residual feedstock. Thus, it is seen that each of the above-noted conversion processes is still in need of improvement.

Various molten salts have been suggested as reaction media for treating hydrocarbon materials. For example, U.S. Pat. No. 3,252,773 suggests the use of an alkali metal carbonate or hydroxide melt to gasify coal. U.S. Pat. No. 3,252,774 suggests the use of the molten salts for the production of hydrogen gases from hydrocarbon materials. U.S. Pat. No. 3,862,025 suggests the use of molten oxides, hydroxides, or mixtures thereof for the cracking of heavy hydrocarbon feedstocks. U.S. Pat. Nos. 3,745,109 and 3,871,992 are exemplary of patents which suggest the use of molten alkali metal carbonates for cracking hydrocarbon materials. In the COSMOS process, developed by Mitsui, crude oil is cracked in an externally heated tubular furnace to form olefins (Yamaguchi, F. et al., "COSMOS Cracks Crude to Olefins," *Hydrocarbon Processing*, September 1979, pp 163–172). It is disclosed that a thin film of molten salt on the walls of the furnace can suppress coke formation and plugging of the reactor tube. They also disclose, however, that if the metal sulfide concentration exceeds about 0.28%, even the special alloys they developed will not withstand the corrosive effect at elevated temperatures. U.S. Pat. No. 3,647,358 suggests the use of a variety of alkali metal halides among other salts for use in the treatment of hydrocarbon materials.

The principal problem with the use of molten salts is that many of them are highly corrosive. Further, those which are not inherently corrosive may become so during use. More particularly, during the processing of a sulfur-containing hydrocarbon feedstock, the sulfur reacts with, for example, sodium carbonate to form sodium sulfide. Even small amounts of sodium sulfide in a carbonate greatly increase its corrosivity. Thus, at the elevated temperatures required for thermal cracking of the hydrocarbon, the presence of even a small amount of sulfide in the sodium carbonate melt requires that all surfaces coming into contact with the melt be protected by expensive ceramic materials which greatly increase processing costs.

Clearly, there is need for an improved process which could minimize the production of low-value products such as petroleum coke and pitch, substantially reduce the problem associated with coke depositionn on equipment surfaces, and also substantially eliminate or reduce the corrosion problems associated with utilizing a molten salt.

SUMMARY OF THE INVENTION

The present invention provides a process for upgrading a hydrocarbon material in the presence of a molten salt which substantially overcomes the problems of carbon or coke buildup in the molten salt and reactor equipment, and minimizes the production of low-value products such as petroleum coke or pitch. The present invention accomplishes the above in a simple low-cost reactor system which reduces the requirements for expensive ceramic materials to withstand the corrosive nature of the salt. In accordance with the process, a molten salt containing carbon is introduced into a heat generation zone which is located in a lower portion of an upwardly extending, elongated reactor. A source of oxygen, preferably pure oxygen or oxygen-enriched air, is introduced into the heat generation zone of the reactor in an amount sufficient to react with substantially all of the carbon and heat the molten salt to a desired temperature, generally a temperature of from about 800° to 1200° C. The heated molten salt, together with the gaseous reaction products, is caused to flow upwardly through the reactor, with a gas phase velocity generally in excess of 1.5 m/sec and preferably in the range of from about 1.5 to 12 m/sec, to a hydrocarbon material reaction zone which is located within the reactor above the heat generation zone.

The hydrocarbon material to be treated is introduced into the reaction zone and the foregoing molten salt where it is reacted to produce gaseous reaction products and unreacted carbon entrained in the flowing molten salt. A reactant material such as steam or hydrogen may also be added to the reaction zone to aid in the cracking operation. Thereafter, the molten salt is withdrawn from the reactor and introduced into a gas removal zone to separate the gaseous reaction products from the molten salt. The molten salt, still containing unreacted entrained carbon, is withdrawn from the gas removal zone and returned to the heat generation zone of the reactor.

In accordance with a particularly preferred embodiment, the reactor further includes a quench zone which is located above the reaction zone and into which there is introduced a quenching medium to reduce the temperature of the molten salt to a temperature below that at which expensive materials of construction, such as ceramics, are required. In accordance with another preferred embodiment, a portion of the molten salt withdrawn from the gas separation zone is cooled and used as the quenching medium introduced into the quench zone of the reactor.

Other advantages of the invention will become more apparent upon consideration of the following detailed description of the preferred embodiment of the invention wherein reference is made to the attached drawing.

BRIEF DESCRIPTION OF THE DRAWING

The sole FIGURE is a schematic illustration of a flow plan representing the major steps of the invention.

DETAILED DESCRIPTION OF THE PREFERRED EMBODIMENT

The present invention is broadly directed to the treatment of a hydrocarbon material to convert a substantial portion of the hydrocarbon into more valuable materials by the application of heat in the presence of a molten salt. Major variables of the invention include salt composition, catalyst type, pressure, temperature, and the use of steam and/or hydrogen. A schematic flow plan representing the basic process is illustrated in the drawing. The schematic shows the basic steps of contacting a hydrocarbon material with a molten salt and a reactant for the hydrocarbon material and means for maintaining the molten salt at a desired temperature.

Molten salt containing unreacted carbon is introduced into a lower portion of an upwardly extending reactor 10 through an inlet 12. Therein, molten salt flows upwardly to a heat generation zone A where it is reacted with oxygen introduced via inlet 14. The carbon and oxygen react, forming gaseous reaction products including CO and $CO_2$, and produce an increase in the temperature of the molten salt. The gaseous reaction products are entrained in the molten salt and provide a lifting force for the molten salt which continues to flow upwardly through reactor 10 to a hydrocarbon reaction zone B. Steam may be added in addition to oxygen to aid in removal of carbon by the reaction $C + H_2O \rightarrow CO + H_2$ and to moderate the temperature.

The hydrocarbon material to be treated is introduced into reaction zone B through inlet 16. Cracking and vaporization of the hydrocarbon material as well as reaction with any added reactant such as steam or hydrogen produces additional gaseous and vapor phase products which provide further lifting force for the molten salt. Not all of the hydrocarbon is converted to vaporized species. Thus, a fraction of the feed remains in the salt as carbon residue or a nonvolatile polymer. The hydrocarbon cracking reactions are generally endothermic (heat consuming). Therefore, the temperature of the salt is reduced in this zone. In some instances this temperature reduction may be sufficient to permit the use of metal alloys as materials of construction for the balance of the system.

As shown in this particularly preferred embodiment, the upward-flowing molten salt next passes to a quench zone C. A quenching medium is introduced through an inlet 18 to reduce the temperature of the molten salt sufficiently that metallic materials of construction may be utilized. This also serves to stop or slow down the cracking reactions. Generally, the quenching medium is introduced in an amount sufficient to reduce the temperature to less than about 650° C. and preferably to less than about 550° C.

The upwardly flowing molten salt exits reactor 10 via outlet 20 where it is introduced into a gas separator 22. The gaseous hydrocarbon reaction products are withdrawn via a conduit 24 for recovery and further processing if required. The molten salt, still containing carbon residue entrained therein, is withdrawn via a conduit 26 and a valve 28 and returned to reactor 10 via inlet 12.

In accordance with one embodiment of the invention, a portion of the molten salt is withdrawn via a conduit 30 and passes through an indirect heat exchanger 32. In heat exchanger 32, the molten salt passes in indirect heat exchange relationship with a heat exchange fluid, for example, water, introduced through a conduit 34 to produce steam for the process, which is withdrawn through a conduit 36. The cooled molten salt passes through a conduit 38 to a holding vessel 40 from which it is withdrawn via a conduit 42 and pump 44 and may be returned to reactor 10 for use as a quench medium via inlet 18.

To prevent the buildup of ash in the circulating molten salt, a purge stream of salt is withdrawn from the system via valve 48 and makeup salt is provided as shown in the FIGURE at an inlet 50.

The present invention is applicable to a wide variety of hydrocarbon materials which may be either solids or liquids. For example, the invention is applicable to coal, lignite, coal-derived liquids, tar, wood and other types of biomass, shale oil, and crude oil, as well as petroleum products and byproducts. When the hydrocarbon material is a solid, it is ground or pulverized prior to its introduction into the molten salt. It is particularly applicable to the treatment of heavy oils, such as atmospheric or vacuum residua, to produce lighter oils or gaseous products, including olefins such as ethylene, propylene, and butene. The type and quantity of the products produced in accordance with the present process will depend, of course, upon the hydrocarbon feed, the molten salt selected, the severity of the treatment, i.e., pressure, temprature, time, and the presence or absence of steam or hydrogen as reactants.

The present process also may be practiced utilizing a variety of molten salts. Generally, the salt is selected to have a melting point below about 600° C. and preferably below about 500° C. In addition, the salt also is preferably one which is substantially inert to the hydrocarbon. Generally, the salt is a mixture of halides and- /or carbonates of alkali or alkaline earth metals. Examples of mixtures of suitable salts are listed in Table I below.

TABLE I

EXAMPLES OF MIXTURES OF SUITABLE SALTS
(All amounts are in Mole %)

| | Melting Point |
|---|---|
| MIXTURES WITH KCl | |
| 41 KCl—59 LiCl | 358° C. |
| 57 KCl—43 BaCl$_2$ | 345° C. |
| 60 KCl—40 CaCl$_2$ | 580° C. |
| 40 KCl—60 MgCl$_2$ | 420° C. |
| 48 KCl—52 PbCl$_2$ | 411° C. |
| 45 KCl—55 ZnCl$_2$ | 230° C. |
| MIXTURES WITH LiCl | |
| 72 LiCl—28 NaCl | 560° C. |
| 45 LiCl—55 PbCl$_2$ | 410° C. |
| MIXTURES WITH NaCl | |
| 33 NaCl—67 CaCl$_2$ | 550° C. |
| 60 NaCl—40 MgCl$_2$ | 450° C. |
| 45 NaCl—55 NiCl$_2$ | 560° C. |
| 28 NaCl—72 PbCl$_2$ | 415° C. |
| MIXTURES WITH CaCl$_2$ | |
| 18 CaCl$_2$—82 PbCl$_2$ | 470° C. |
| 50 CaCl$_2$—50 ZnCl$_2$ | 600° C. |
| MIXTURES OF CARBONATES | |
| 25.3 K$_2$CO$_3$; 45.5 KCl; 29.2 Na$_2$CO$_3$ | 545° C. |
| 25.0 K$_2$CO$_3$; 45.0 KCl; 28.8 Na$_2$CO$_3$; 1.2 MgCO$_3$ | 450° C. |
| 25.0 K$_2$CO$_3$; 45.1 KCl; 28.9 Na$_2$CO$_3$; 1.0 MgCl$_2$.6H$_2$O | 430° C. |
| 52.2 K$_2$CO$_3$; 37.3 Li$_2$CO$_3$; 10.5 Na$_2$CO$_3$ | 395° C. |
| 24.5 K$_2$CO$_3$; 44.5 Li$_2$CO$_3$; 31.0 Na$_2$CO$_3$ | 394° C. |

Returning again to the drawing, it is seen that the molten salt which contains a combustible carbonaceous material, such as char or coke, is introduced into reactor 10 via inlet 12 where it flows upwardly into heat generation zone A for oxidation with a reactive source of oxygen. Generally, pure oxygen is preferred to avoid dilution of the final hydrocarbon products with nitrogen. Obviously, of course, air or oxygen-enriched air also could be used, and some steam may be added at this point to aid in the removal of carbon by the carbon/steam reaction and prevent the generation of too high a temperature which might occur with oxygen alone.

In some instances it may be necessary to add an auxiliary fuel to the salt in heat generation zone A to heat the salt to the desired temperature. In such instances, the auxiliary fuel may be obtained, for example, by recycling a portion of the gaseous hydrocarbon reaction products, such as a fraction containing carbon monoxide, hydrogen and methane. Alternatively, a portion of the hydrocarbon material being treated may be introduced into heat generation zone A. It will be obvious, of course, that a combustible material from any other source also could be utilized.

The principal desired results to be accomplished in heat generation zone A are to eliminate substantially all of the carbonaceous material and to raise the temperature of the molten salt to a desired level. The temperature in this zone must be above about 700° C. and generally will be between about 800° and 1200° C. to ensure complete oxidation of the carbonaceous material. The heated molten salt provides the principal source of heat for the pyrolysis of the hydrocarbon material introduced into reaction zone B. The pressure in reactor vessel 10 is not critical, and the process can be carried out at any practical pressure.

The conditions within reaction zone B will vary depending upon the feedstock and the type of products desired. For example, temperatures during cracking operations may vary from as low as 400° C. up to about 1100° C. or higher. The lower temperature range is used for viscosity breaking, while the upper temperature range represents more severe cracking operations.

Conversion reactions such as hydrocracking, wherein the hydrocarbon is reacted with hydrogen, are accomplished by introducing a stream of hydrogen through inlet 16 to reaction zone B. In hydrocracking, the pressure in reaction zone B will normally be within the range of from about 6 to 130 atmospheres and a temperature of from about 650° to 850° C. It will also be appreciated that catalysts can be added to the molten salt. Examples of suitable catalysts include the oxides, halides, and sulfides of the transition metal elements.

In addition to containing catalyst, various inhibitors or promoters also could be added to the molten salts. For example, in U.S. Pat. No. 3,871,992, it is reported that the presence of glass-forming oxides in an alkali metal carbonate melt promotes dispersion of coke particles formed during the hydrocarbon cracking process. Accordingly, it is within the scope of the present invention that the molten salt could also contain from about 0.1 to 25 wt %, based on the total weight of molten salt, of a glass-forming oxide selected from the group consisting of the oxides of boron, phosphorus, vanadium, silicon, tungsten and molybdenum, with the oxides of boron being preferred.

As depicted in the drawing, it is seen that the interior of reactor 10 is provided with ceramic lining 46 since most molten salts are corrosive at elevated temperatures and, particularly, the molten carbonates when they contain as little as 1% sulfide. However, conventional materials of construction such as steel alloys may be used at lower temperatures.

Accordingly, in accordance with a particularly preferred embodiment of the present invention, the molten salt and entrained reaction products leaving reaction zone B are passed into a quench zone C to reduce the temperature to a point such that ceramic materials are no longer required. Generally, if the temperature is below about 650° C., ceramic materials are no longer required. The temperature could be reduced still lower if desired, provided, however, that it is maintained above the melting point of the salt. However, in the interest of thermal efficiency, it is generally preferred to maintain the temperature as high as possible, consistent with the use of metal alloys. Thus, the balance of the system shown in the drawing may be formed from metal alloys. Advantageously, when the hydrocarbon feed contains significant amounts of sulfur, the molten salt is quenched with water (either liquid or vapor phase) to aid in the conversion of sulfur contained therein to H$_2$S, such that it can be removed along with the other gaseous reaction products. The conversion of, for example, an alkali metal sulfide to H$_2$S normally also requires the presence of CO$_2$ and follows the reaction: M$_x$S + H$_2$O + CO$_2$ → M$_x$CO$_3$ + H$_2$S. Generally, a sufficient concentration of CO$_2$ is present from the gasification of char or carbon residue in zone A.

The operation of the various hydrocarbon conversion processes in accordance with the present invention has numerous advantages. For example, coke formation and deposition do not present a serous problem, as the coke is entrained in the molten salt and ultimately consumed and utilized as the source of heat in heat generation zone A. Further, when catalysts are used, they do not undergo deterioration or fouling, since the coke is continuously removed. In addition, the direct contact of the hydrocarbon with the molten salt ensures efficient heat transfer in the reaction zone and provides a process wherein good control of both reaction temperature and time can be obtained. Still further, since the reaction products are all entrained in the flow of molten salt, high mass throughputs are attainable, and high pressures can be used for even higher throughputs. Still further, since the present invention provides for reducing the temperature of the molten salt to one at which conventional materials of construction can be utilized, only a small part of the overall system need be lined with expensive corrosion-resistant materials such as ceramic. Finally, all key steps including heat generation, reaction and quenching are carried out in a single vertical tube resulting in a greatly simplified equipment design. Although in the preferred arrangement, flow is induced by the gases added and those formed in the reactor section, a pump may be used to force flow and provide a higher throughput than would otherwise be attainable.

EXAMPLE

The present invention will now be further illustrated with respect to the predicted treatment of a petroleum residual. Approximately 1619 kg/hr of a mixture of molten salt and unreacted carbon or coke are introduced into reactor 10 through inlet 12 at a temperature of 650° C. The molten salt comprises a ternary eutectic alkali metal carbonate mixture containing 5.8 mole % of alkali metal sulfides. The pure ternary carbonate eutectic comprises 44.5 mole % $Li_2CO_3$, 31.0 mole % $Na_2CO_3$ and 24.5 mole % $K_2CO_3$. Also included in the molten salt is approximately 1.2 wt %, based on the total weight of salt, of unreacted carbon or coke. This mixture is introduced into heat generation zone A where it is reacted with oxygen introduced through inlet 14. The oxygen is introduced at a rate of 29.6 kg/hr and at a temperature of approximately 25° C. The oxygen and unreacted coke react to increase the temperature of the salt passing upwardly to reaction zone B to a temperature of approximately 807° C.

A petroleum residual having a nominal composition of 85.1 wt % carbon, 9.5 wt % hydrogen, 1.4 wt % oxygen, and 4 wt % sulfur is introduced into reaction zone B at a rate of approximately 100 kg/hr and at a temperature of 150° C. Also introduced into reaction zone B is steam at a temperature of approximately 150° C. and at a rate of approximately 15 kg/hr. The steam and hydrocarbon react and the hydrocarbon is thermally cracked in reaction zone B resulting in entrained gaseous reaction products being carried with the molten salt. In addition, since many of the reactions taking place are endothermic, the temperature of the molten salt is reduced to about 688° C. prior to entering quench zone C.

In quench zone C, additional steam at a temperature of about 150° C. is introduced at a rate of about 70 kg/hr to further cool the molten salt to a temperature which will permit the use of conventional metal alloys for the construction of the balance of the system. In quench zone C the temperature of the molten salt is reduced to less than about 650° C.

The molten salt carrying entrained gaseous hydrocarbon reaction products, steam, and unreacted carbon passes to gas separator 22 via outlet 20. The gaseous products are removed from conduit 24. The results of an analysis of the gaseous products are set forth in Table II below.

TABLE II

RESULTS OF THE ANALYSIS OF THE GASEOUS PRODUCTS

|  | kg/hr |
|---|---|
| $CH_4$ | 6.50 |
| $C_2H_6$ | 1.80 |
| $C_2H_4$ | 11.80 |
| $C_3H_6$ | 6.60 |
| $C_4H_8$ | 5.40 |
| CO | 3.50 |
| $CO_2$ | 53.40 |
| $H_2$ | 1.64 |
| $H_2S$ | 2.98 |
| Benzene | 5.20 |
| Toluene | 2.60 |
| Ethylbenzene | 0.66 |
| Xylenes | 0.59 |
| Styrene | 0.55 |
| Medium + Heavy Oil | 33.40 |
| $C_3$-$C_9$ Nonaromatic | 5.30 |
| Steam | 72.40 |
|  | 214.32 |

The molten salt and unreacted carbon are removed from gas separator 22 via conduit 26 and returned to reactor 10 via inlet 12 where the cycle is repeated. Thus, this example demonstrates an application of the present invention which minimizes the amount of expensive ceramic materials required for the processing of a hydrocarbon in a molten salt and greatly simplifies the design and construction of the balance of the system components required.

The invention has been described herein with reference to preferred embodiments and certain specific parameters; however, it will be apparent to those skilled in the art that many other modifications, adaptations, and uses of this hydrocarbon treatment process are possible without departure from the spirit and scope of the invention as defined by the claims below.

What is claimes is:
1. A continuous process for treating a hydrocarbon material in the presence of a molten salt wherein the improvement comprises the sequential steps of:
    introducing a molten salt containing carbon into a heat generation zone located in a lower portion of an upwardly extending, elongated reactor, said reactor comprising a single continuous chamber;
    introducing a source of oxygen into said lower portion of said reactor in an amount sufficient to react with said carbon and heat said molten salt to a temperature of at least 700° C. while forming gaseous combustion products;
    flowing the resulting mixture of gaseous combustion products and heated molten salt upwardly through said reactor with a gas phase velocity of at least 1.5 meters per second to a hydrocarbon material reaction zone located above said heat generation zone;
    introducing the hydrocarbon material to be treated into said reaction zone to produce gaseous reaction products and unreacted carbon entrained in said flowing molten salt;
    reducing the temperature of said molten salt to less than about 650° C.;
    withdrawing said molten salt from said reaction zone and said reactor, and introducing it into a gas removal zone and separating gaseous reaction product therefrom;

withdrawing molten salt containing unreacted entrained carbon from said gas removal zone and returning it to said heat generation zone.

2. The process of claim 1 wherein said reactor includes a quench zone located above said reaction zone into which there is introduced a quenching medium to reduce the temperature of said molten salt to less than about 550° C. and arrest any further significant reaction of said hydrocarbon material.

3. The process of claim 1 wherein steam also is introduced into said reaction zone.

4. The process of claim 1 wherein hydrogen also is introduced into said reaction zone.

5. The process of claim 2 wherein said quenching medium is water.

6. The process of claim 2 further including withdrawing a portion of the molten salt withdrawn from said gas separation zone, cooling it, and introducing it as the quenching medium into the quench zone of said reactor.

7. The process of claim 1 wherein said hydrocarbon material is pulverized coal.

8. The process of claim 1 wherein said hydrocarbon material is selected from the group consisting of petroleum products and byproducts.

9. The process of claim 1 wherein said molten salt comprises a mixture of alkali metal carbonates.

10. The process of claim 1 wherein said molten salt further includes at least one catalyst selected from the group consisting of the oxides, halides and sulfides of a transition metal element.

11. The process of claim 1 wherein said molten salt comprises a mixture of alkali metal halides.

12. The process of claim 1 wherein steam also is introduced into said heat generation zone.

* * * * *